US011100765B2

(12) United States Patent
Farivar et al.

(10) Patent No.: US 11,100,765 B2
(45) Date of Patent: *Aug. 24, 2021

(54) SYSTEM AND METHOD FOR DETECTING ATM FRAUD USING A FORCE SENSOR

(71) Applicant: Capital One Services, LLC, McLean, VA (US)

(72) Inventors: Reza Farivar, Champaign, IL (US); Kate Key, Champaign, IL (US); Anh Truong, Champaign, IL (US); Mark Watson, Sedona, AZ (US); Vincent Pham, Champaign, IL (US); Fardin Abdi Taghi Abad, Seattle, WA (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,537

(22) Filed: Sep. 2, 2020

(65) Prior Publication Data

US 2021/0150863 A1    May 20, 2021

Related U.S. Application Data

(63) Continuation of application No. 16/688,105, filed on Nov. 19, 2019, now Pat. No. 10,796,537.

(51) Int. Cl.
*G07F 19/00* (2006.01)
*G06Q 20/10* (2012.01)
(Continued)

(52) U.S. Cl.
CPC ....... *G07F 19/207* (2013.01); *G06Q 20/1085* (2013.01); *G06Q 20/4016* (2013.01);
(Continued)

(58) Field of Classification Search
CPC ... G06Q 20/1085; G07F 19/20; G07F 19/201; G07F 19/202; G07F 19/203; G07F 19/205; G07F 19/207; G07F 19/209
(Continued)

(56) References Cited

U.S. PATENT DOCUMENTS

| 4,252,251 | A | 2/1981 | Ek et al. |
| 4,608,485 | A | 8/1986 | Miura |

(Continued)

FOREIGN PATENT DOCUMENTS

| DE | 29622427 | 12/1996 |
| EP | 0175175 | 8/1985 |
| WO | 2016147347 | 9/2016 |

OTHER PUBLICATIONS

Machine translation of EP 175175, retrieved from European Patent Office, retrieved Mar. 11, 2020 (Year: 2020).

(Continued)

*Primary Examiner* — Suezu Ellis
(74) *Attorney, Agent, or Firm* — Hunton Andrews Kurth LLP

(57) ABSTRACT

Systems and methods for ATM fraud detection are presented. ATM fraud detection may be provided in the context of a currency dispenser configured to dispense currency notes and a force sensor configured to detect a force applied to the currency dispenser, and a processor configured for data communication with the currency dispenser and the force sensor. The processor may issue an alert if the force sensor detects the force for longer than a predetermined time period.

20 Claims, 6 Drawing Sheets

(51) Int. Cl.
  *G07D 7/202* (2016.01)
  *G06Q 20/40* (2012.01)
(52) U.S. Cl.
  CPC ........... *G07D 7/202* (2017.05); *G07F 19/202* (2013.01); *G07F 19/209* (2013.01)
(58) Field of Classification Search
  USPC ............................................ 235/379; 705/43
  See application file for complete search history.

(56) References Cited

U.S. PATENT DOCUMENTS

| | | |
|---|---|---|
| 5,897,625 A | 4/1999 | Gustin et al. |
| 5,900,607 A | 5/1999 | Awatsu et al. |
| 5,987,439 A | 11/1999 | Gustin et al. |
| 6,014,649 A | 1/2000 | Kobayashi et al. |
| 6,073,837 A | 6/2000 | Milne |
| 7,513,417 B2 | 4/2009 | Burns et al. |
| 7,559,460 B2 | 7/2009 | Burns et al. |
| 7,591,414 B2 | 9/2009 | Carpenter et al. |
| 7,748,611 B2 | 7/2010 | Carpenter et al. |
| 7,748,612 B2 | 7/2010 | Carpenter et al. |
| 7,815,104 B2 | 10/2010 | Carpenter et al. |
| 7,850,076 B1 | 12/2010 | Dorenbaum |
| 8,915,427 B2 | 12/2014 | Dietz et al. |
| 9,027,830 B2 | 5/2015 | Doi et al. |
| 9,424,704 B2 | 8/2016 | Sasaki et al. |
| 10,049,532 B1 | 8/2018 | Faletti et al. |
| 10,796,537 B1 * | 10/2020 | Farivar .................. G07D 7/202 |
| 2002/0120572 A1 | 8/2002 | Bellucci et al. |
| 2003/0041028 A1 | 2/2003 | Blackson et al. |
| 2005/0010525 A1 | 1/2005 | Ross et al. |
| 2005/0258236 A1 | 11/2005 | Boyes et al. |
| 2006/0151595 A1 | 7/2006 | Carpenter et al. |
| 2006/0253349 A1 | 11/2006 | Brooks et al. |
| 2009/0266879 A1 | 10/2009 | Gustin et al. |
| 2010/0100230 A1 | 4/2010 | Babu et al. |
| 2011/0259706 A1 | 10/2011 | Aas et al. |
| 2011/0295741 A1 | 12/2011 | Sugitani et al. |
| 2012/0054099 A1 | 3/2012 | Fox et al. |
| 2014/0332339 A1 | 11/2014 | Crist et al. |
| 2014/0332341 A1 | 11/2014 | Crist et al. |
| 2014/0337211 A1 | 11/2014 | Crist et al. |
| 2014/0337212 A1 | 11/2014 | Crist et al. |
| 2014/0338986 A1 | 11/2014 | Crist et al. |
| 2015/0148945 A1 | 5/2015 | Kobayashi et al. |
| 2015/0170454 A1 | 6/2015 | Sasaki et al. |
| 2016/0117880 A1 | 4/2016 | Crist et al. |
| 2016/0133102 A1 | 5/2016 | Crist et al. |
| 2017/0308876 A1 | 10/2017 | Inglis et al. |

OTHER PUBLICATIONS

Machine translation of DE 29622427, retrieved Sep. 9, 2020, European Patent Office (Year: 2020).

\* cited by examiner

SYSTEM AND METHOD FOR DETECTING ATM FRAUD USING A FORCE SENSOR

CROSS REFERENCE TO RELATED APPLICATION

This application is a continuation of U.S. patent application Ser. No. 16/688,105 filed Nov. 19, 2019, the complete disclosure of which is incorporated herein by reference in its entirety.

FIELD OF THE DISCLOSURE

The present disclosure relates generally to automated teller machine (ATM) technology and, more specifically, to exemplary systems and methods for detecting attempted fraudulent activity aimed at automated teller machines.

BACKGROUND

An ATM is an electromechanical device that allows banking customers or users to carry out financial transactions without the need for a human teller. For example, customers may use an ATM to access their bank accounts, deposit, withdraw, or transfer funds, check account balances, or dispense items of value. Generally, to use an ATM, the customer may insert a banking card containing an account identifier, such as a magnetic stripe, into the ATM's card reader, and authenticate the card by entering a personal identification number (PIN). Once the card has been read and authenticated, the customer can carry out various financial transactions, including withdrawal of cash from the ATM that would be deducted from the bank account.

In cash withdrawal transactions, the ATM will proceed to dispense the requested cash, for example via a cash port. If the customer is forgetful or becomes distracted, the customer may neglect to remove the cash from the cash port, and the unremoved cash may be retracted by the ATM without deducting the amount from the customer's account. In some instances, however, thieves have fraudulently taken some of the cash before retraction—typically by removing some of the bills or notes from the middle of the stack, leaving some of the cash behind to mislead the ATM into retracting the remaining cash and not deducting any amount from the customer's account. This results in losses to the bank or ATM host.

Thus, it may be beneficial to provide exemplary systems and methods which identify such fraud by detecting the removal of some, but not all dispensed cash to overcome at least some of the deficiencies described herein.

SUMMARY

Aspects of the disclosed technology include systems and methods for ATM fraud detection. ATM fraud detection may be provided in the context of using a currency sensor to image and count any currency notes that remain after being dispensed to a user, and determining if the count is correct for the currency notes dispensed; any removed bills would result in a count discrepancy. In this way, ATM fraud attempts may be detected. This provides an advantage over current ATM technology which lacks the ability to detect this form of ATM fraud.

Embodiments of the present disclosure provide an automated teller machine (ATM) comprising: a currency dispenser configured to dispense currency notes to a user; a currency sensor; and a processor configured for data communication with the currency dispenser and the currency sensor; wherein, any currency notes remaining in the currency dispenser after being dispensed to the user are retracted; and wherein, the processor is configured to determine the count of the retracted currency notes.

Embodiments of the present disclosure provide a method of detecting ATM fraud, comprising: receiving a withdrawal request from a user via an input device; retrieving currency notes from a currency cassette; presenting the currency notes to the user via a currency dispenser; retracting some or all of the presented currency notes via the currency dispenser; scanning the retracted currency notes; and comparing the count of the retracted currency notes to a count of the currency notes retrieved from the currency cassette.

Embodiments of the present disclosure provide an ATM fraud detection system, comprising: a currency cassette containing currency notes; a currency dispenser configured to receive currency notes from the currency cassette and present the currency notes to a user; a currency sensor configured to scan the currency notes presented to the user; and a processor configured for data communication with the currency dispenser and the currency sensor; wherein the currency dispenser is configured to retract the currency notes upon receiving a command from the processor, wherein the currency sensor is configured to scan the currency notes retracted by the currency dispenser, and wherein the processor is configured to compare the count of the currency notes presented to the user and the count of the currency notes retracted by the currency dispenser, and to determine a fraud condition if the count of the presented currency notes differs from the count of the retracted currency notes.

Further features of the disclosed design, and the advantages offered thereby, are explained in greater detail hereinafter with reference to specific example embodiments described below and illustrated in the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for ATM fraud detection through use of a currency sensor, such as, e.g., a scanner, to count any dispensed cash that remains and determining if there is a count discrepancy from any removed bills resulting from attempted theft or fraud. Benefits of the disclosed technology may include improved fraud prevention and improved user experience.

Figure 1:
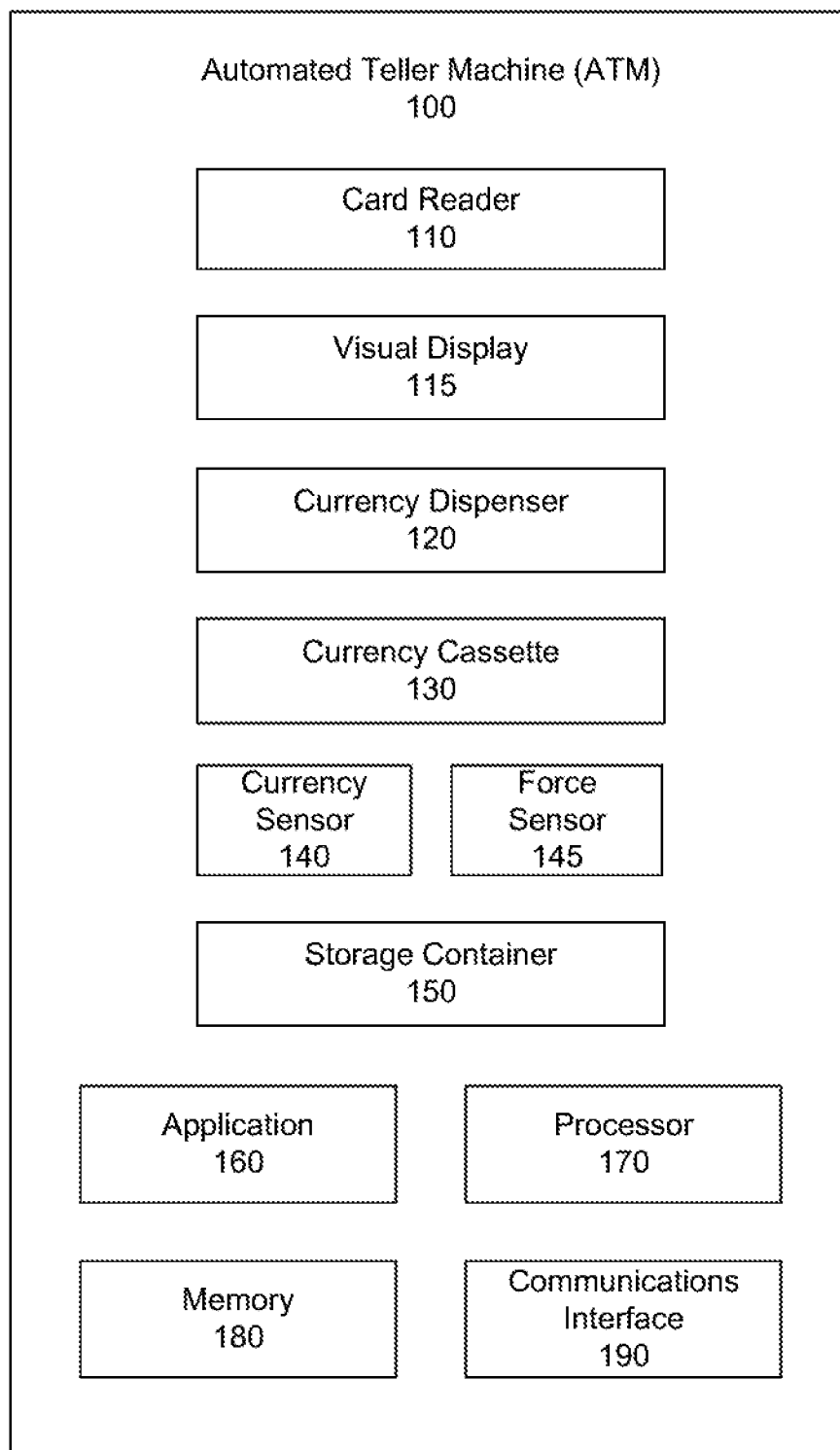
FIG. 1 is a diagram of an ATM fraud detection system according to one or more example embodiments.

FIG. 1 shows a diagram illustrating an ATM fraud detection system 100 according to one or more example embodiments. As discussed further below, system 100 may include card reader 110, visual display 120, currency dispenser 120, currency cassette 130, currency sensor 140, force sensor 145, storage container 150, application 160, processor 170, memory 180, and/or communications interface 190. ATM system 100 may communicate with a bank or other backend processing system (not shown) via a network (not shown). Although FIG. 1 illustrates certain components, system 100 may include additional or multiple components connected in various ways. It is understood that not all embodiments include every component shown in FIG. 1. It is also understood that, while FIG. 1 depicts a single instance of each component, embodiments may contain multiple instances of any components.

Card reader 110 may be any device configured to detect the presence of a card within the ATM of system 100. Card reader 110 may include a card sensor and/or a near field communication (NFC) reader. Card reader 110 may be configured to read and authenticate an account-linked card associated with a user (such as an account holder). Card reader 110 may be in data communication with processor 170 and configured to provide the processor with a card notification when a card is inserted into or removed from the card reader or is tapped against the card reader.

System 100 may include a visual display 115 for displaying a graphical user interface to a user. Visual display 115 may include any type of device for presenting visual information such as a computer monitor, video monitor, a flat panel display, touch screen display, or a mobile device screen, and may include technology such as, for example, liquid crystal display, light-emitting diode (LED) display, plasma panel, and/or a cathode ray tube display technology. Visual display 115 may be in data communication with processor 170. System 100 may further include an input device (not shown), which may include any device for inputting information, commands or data, such as, e.g., a keypad, keyboard, electronic pen, touch screen interface, microphone, etc. System 100 may further include an output device (such as, e.g., speaker or indicator lights) providing information or alerts. In some embodiments, the input/output devices may be incorporated in whole or in part with visual display 115 (such as, e.g., a touch screen display). Any input or output device(s) may be in data communication with processor 170.

System 100 may also include, or be in data communication with, an imaging device (not shown) such as, e.g., a digital camera, video recorder, or camcorder. The imaging device may be positioned to capture or record images within the vicinity of ATM system 100, such as, for example, capturing images of a user as the user may be using the ATM of system 100. The imaging device may be in data communication with processor 170 and configured to capture or record images upon command or signal initiated by processor 170. As used herein, a command may include a signal.

Currency dispenser 120 may include a device to dispense (e.g., present or deliver) currency notes to a user. Currency dispenser 120 may include one or more electro-mechanical components such as, e.g., one or more belts, one or more gears, one or more motors, and/or one or more plates or trays. Currency dispenser 120 may include one or more sensors to detect presence, position and/or movement of currency notes. Currency notes to be dispensed may be placed or positioned within currency dispenser 120. The particular placement or positioning of currency notes may depend on the particular configuration of currency dispenser 120. For example, if currency dispenser 120 includes a belt, currency notes may be placed on the belt; as another example, if currency dispenser 120 includes a tray, currency notes may be placed in the tray. Currency dispenser 120 may include a cash port or cash opening through which currency notes are presented for the user to physically remove from the ATM of system 100. Currency dispenser 120 may be configured to detect the presence and/or absence of currency notes, which may indicate when a user removes, or fails to remove, currency notes which have been dispensed to the user. Currency dispenser 120 may be in data communication with processor 170, and may operate pursuant to commands or signals from processor 170. Currency dispenser 120 may be configured to send a notification or signal to the processor when the user removes currency notes from the ATM device.

System 100 may include one or more currency cassettes 130. Each currency cassette 130 may be configured to hold a plurality of currency notes to be dispensed to users. Each currency cassette 130 may hold currency notes of a different denomination/value (e.g., face value) than notes held in other currency cassettes that may be contained in the ATM of system 100. Each currency cassette 130 may be in data communication with processor 170. Currency notes to be dispensed via currency dispenser 120 may be obtained by retrieving currency notes from one or more currency cassettes 130; the process of retrieving currency notes may include transferring the currency notes to currency dispenser 120. Retrieval of currency notes from one or more currency cassettes 130 may be performed upon command or signal from processor 170.

Currency sensor 140 may be implemented in a plurality of ways, including as an optical sensor, a weight sensor, and a stack count sensor. In some examples, currency sensor 140 may be an optical sensor, which may be any device configured to scan and count one or more currency notes and/or capture image data for each scanned note. In these examples, a scanner may be incorporated within currency dispenser 120 such that any currency notes within currency dispenser 120 may be scanned and counted. A scanner may include, e.g., a small digital camera along with a light source positioned behind and/or on top of a currency note. For example, if currency dispenser 120 includes a tray, the optical currency sensor 140 may be mounted on, integrated with or otherwise arranged such that any currency notes on the tray may be scanned. In some embodiments, the currency sensor 140 may be arranged adjacent to or in the vicinity of currency dispenser 120 such that any currency notes within currency dispenser 120 may be scanned. In some embodiments, the currency sensor 140 may be in a fixed position relative to other components, such that scanning may occur based on activating currency sensor 140 to capture image data as currency notes may be in position or in motion within currency dispenser 120. Currency sensor 140 may include or incorporate a digital image sensor, an infrared sensor, an ultraviolet sensor, and/or a sensor which detects reflectivity for security bands within a currency note. Currency sensor 140 may provide data in the form of image data for each currency note scanned. Image data may include data from one or multiple sensors (such as, e.g., visual image data, infrared data, ultraviolet data, and/or reflectivity data) and may include multiple images from both sides of the note. Currency sensor 140 may be in data communication with processor 170. In some embodiments, another counting device (not shown) may be used in addition to, or in place of, currency sensor 140.

In some examples, the currency sensor 140 may be a weight sensor. In these examples, the currency sensor may include one or more elements configured to measure weight, such as a strain gauge and a deflection sensor. The weight sensor may function to determine the number of bills based on their weight, and may be in data communication with processor 170. In addition, the weight sensor may be integrated with, or complementarily arranged with, the force sensor 145.

In some examples, the currency sensor 140 may be a stack count sensor. In these examples, the stack count sensor may include one or more elements configured to detect the number of bills using one or more detection mechanisms. Exemplary detection mechanisms may include a light output and light sensor configured to direct a light beam towards a bill and monitor for interruptions of the beam, one or more wheels comprising grips or grooves to separate and manipulate bills, and/or an optical pattern sensor. The stack count sensor may be in data communication with processor 170.

The currency sensor 140 may be implemented as a combination of one or more of the foregoing sensors, such as one or more of the optical sensor, the weight sensor, and the stack count sensor. The implementation of the currency sensor may vary based on the structure and functionality of ATM 100, including the number of currency types and the number of denominations handled by the ATM 100. Thus, ATM 100 may require a different currency sensor implementation and/or a different number of currency sensors if it is configured to handle only bills of a certain type or denomination, e.g., U.S. $20 bills, than if it is configured to handle multiple currency types and multiple denominations. For example, if ATM 100 is configured to handle only a certain type and denomination of currency, determining a bill's face value may not be necessary and a determination of the number of bills or the weight of a stack of bills may be sufficient. In contrast, if ATM 100 is configured to handle multiple types and/or multiple denominations of currency, determining a bill's face value may be necessary.

Force sensor 145 may be any device configured to detect forces on one or more currency notes as the notes are being dispensed to a user. Force sensor 145 may include, e.g., a strain gauge, deflection sensor, etc., and may be incorporated with currency dispenser 120. For example, if currency dispenser 120 includes a cash port, force sensor 145 may be mounted on, integrated with or otherwise arranged such that any forces applied to the currency notes within the cash port (such as, e.g., attempts to manually manipulate the notes) may be detected. Force sensor 145 may be in data communication with processor 170. As another example, force sensor 145 may be operably connected to currency dispenser 120, in data communication with processor 170, and force sensor 145 may detect any forces applied to the currency dispenser 120 (e.g., pushing forces and pulling forces). In some examples, the processor 170 may issue an alert if force sensor 145 detects a pushing force for longer than a predetermined time period.

Storage container 150 may be any container within the internal structure of ATM 100 configured to store currency notes. Storage container 150 may be used as a receptacle to store currency notes that may be retracted, or otherwise removed from currency dispenser 120. In some embodiments, storage container 150 may be a secure container such that access to notes stored therein may be accessed only via a key or security code, etc. In some embodiments, a second currency sensor 140 may be mounted on, integrated with or otherwise arranged with storage container 150 such that any currency notes in the container may be scanned and counted. In some embodiments, ATM system 100 may accept currency notes deposited by a user. In some embodiments, ATM system 100 may include a deposit port (not shown) through which a user may deposit currency notes into the ATM. In some embodiments, currency notes deposited by a user may be placed in storage container 150. In some embodiments, currency notes deposited by a user may be scanned by currency sensor 140 or another currency sensor.

Application 160 may include a software application or executable program code stored in memory 180 to be executed on processor 170, and be configured to carry out features described herein for any of the ATM devices described herein. Application 160 may be configured, for example, to transmit and/or receive data with other devices via communications interface 190 of ATM device 100. For example, application 160 may be configured to initiate or respond to one or more requests and/or to send or receive messages, such as requests or messages involving requests to withdraw currency notes from ATM 100. Application 160 may also be configured to/provide a user interface via visible display 115. Further features carried out by application 160 are described below with reference to FIG. 2.

Processor 170 may include one or more processing devices such as a microprocessor, RISC processor, ASIC, etc., and may include associated processing circuitry. Processor 170 may include, or be connected to, memory (such as memory 180) storing executable instructions and/or data, as may be necessary or appropriate to control, operate or interface with the other features of ATM system 100, including application 160 or any other applications running on ATM system 100. Processor 170 (including any associated processing circuitry) may contain additional components including processors, memories, error and parity/CRC checkers, data encoders, anticollision algorithms, controllers, command decoders, security primitives and tamper-proofing hardware, as necessary to perform the functions described herein.

Memory 180 may include read-only memory, write-once read-multiple memory and/or read/write memory, e.g., RAM, ROM, and EEPROM, including any combination thereof. Memory 180 may store executable instructions and/or data, as may be necessary or appropriate to control, operate or interface with the other features of ATM system 100, including any applications running on ATM system 100.

Communications interface 190 may include wired or wireless data communication capability. Communications interface 190 may be configured for data communication between ATM system 100 and other devises, such as, e.g., servers, back-end systems, mobile devices, etc., over a network and protocol common to such devices. These capabilities may support data communication with a wired or wireless communication network, including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a WiFi network or corporate LAN). Communications interface 190 may support communication via a short-range wireless communication field, such as Bluetooth, NFC, or RFID, and may include a reader, such as a NFC reader.

Communications between ATM system 100 and other devices may be encrypted or decrypted using any suitable cryptographic method. In some embodiments, processor 170 may encrypt data (e.g., account data) prior to transmitting data to other devices, using any suitable cryptographic method. Communication between devices may include any methods used for data communication over a network, including, for example, a text message, an e-mail, or other messaging techniques appropriate in a network-based configuration. Communication methods may include an actionable push notification with an application stored on a mobile device.

FIGS. 2A-2D illustrate interactions between components of an ATM fraud detection system according to one or more example embodiments, with reference to components and features described above including but not limited to the figures and associated description. These interactions may include commands, signals or data exchanged between processor 170 and other components, including currency sensor 140, of ATM system 100.

Figure 2A:
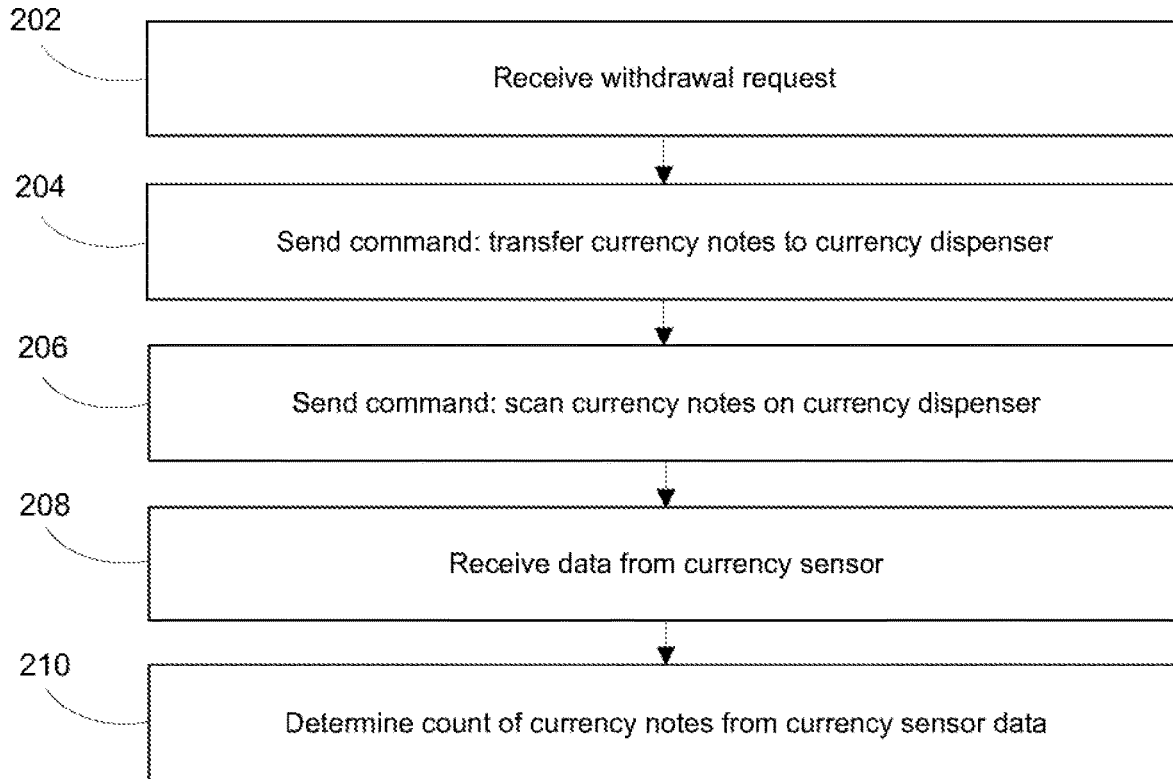
FIGS. 2A-2D illustrate interactions between components of an ATM fraud detection system according to one or more example embodiments.

Referring to FIG. 2A, at block 202 ATM system 100 may receive from a user a request to withdraw currency notes from the ATM. The user's request to withdraw currency notes may be received via an input device on the ATM. The input device may be in data communication with processor 170. As described above, an input device may include any device for inputting information, commands or data, such as, e.g., a keypad, keyboard, electronic pen, touch screen interface, microphone, etc. For example, a menu of commands may be presented to the user via touch screen display and interface upon insertion of an account-linked card into card reader 110 by the user.

At block 204, processor 170 may issue a command to retrieve currency notes and transfer the currency notes to currency dispenser 120. The currency notes to be dispensed may be retrieved from one or more currency cassettes 130, and may be positioned within currency dispenser 120; positioning of the retrieved currency notes may be based on the particular configuration of currency dispenser 120. The currency notes retrieved may be selected to satisfy the user's withdrawal request, as described further below with reference to FIG. 2B.

At block 206, processor 170 may issue a scan command to currency sensor 140 to scan the currency notes transferred to currency dispenser 120 (e.g., such as described above with reference to FIG. 1); the scan command may include a read command to read data from currency sensor 140. As described above, currency sensor 140 may be incorporated or positioned within currency dispenser 120. In some embodiments, currency sensor 140 may be configured to activate to scan notes within currency dispenser 120 only upon a command. In some embodiments, currency sensor 140 may be configured to activate and scan notes within currency dispenser without receiving a command, e.g., currency sensor 140 may be always active or may activate on a periodic basis, or may otherwise activate upon signal from another component. A read command may allow processor 170 to read data from currency sensor 140.

At block 208, processor 170 may receive data from currency sensor 140. Receipt of data from currency sensor 140 may be responsive to the scan command (block 206), which may be or include a read command, or to another signal. The currency sensor data relates to currency notes within currency dispenser 120 to be dispensed.

At block 210, processor 170 may determine the count of the currency notes to be dispensed based on the data received from currency sensor 140. In some embodiments, the processor 170 may determine the value of the currency notes to be dispensed based on the data received from currency sensor 140, which may include image data for each of the currency notes. For example, the denomination of each imaged currency note may be determined from the image data, and the value of the currency notes to be dispensed may be determined by summing the denomination as determined for each of these currency notes. In some embodiments, processor 120 may receive data or signals from another counting device and use such data or signals to determine the count of the currency notes to be dispensed.

Figure 2B:
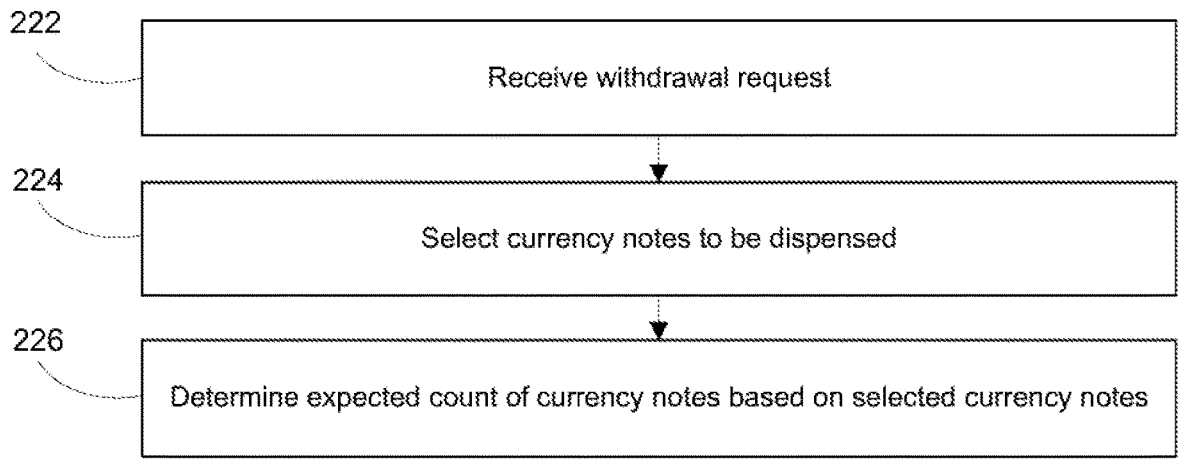

With reference to FIG. 2B, at block 222, ATM system 100 may receive from a user a request to withdraw currency notes from the ATM, as described above with reference to block 202 (FIG. 2A).

At block 224, the currency notes to be retrieved from the currency cassette(s) and dispensed to the user may be selected to satisfy the user's withdrawal request. The number and denomination of currency notes to be retrieved may depend upon the amount (value) of currency requested by the user to be withdrawn, and/or the availability of currency notes of a certain denomination in a currency cassette. For example, if the user requests withdrawal of one hundred dollars ($100.00), and if the system has a currency cassette with available currency notes of twenty dollar ($20) denomination, the system may retrieve five currency notes of twenty dollar ($20) denomination. As another example, if the user requests withdrawal of fifty dollars ($50.00), and if the system has a currency cassette with available currency notes of twenty dollar ($20) denomination and another currency cassette with available currency notes of ten dollar ($10) denomination, the system may retrieve two currency notes of twenty dollar ($20) denomination and one currency note of ten dollar ($10) denomination. As another example, if the user requests withdrawal of fifty dollars ($50.00), and if the system has a currency cassette for currency notes of twenty dollar ($20) denomination, but that cassette is empty, and another currency cassette with available currency notes of ten dollar ($10) denomination, the system may retrieve five currency notes of ten dollar ($10) denomination. It will be understood that other combinations of currency denomination selections may be made to satisfy a user's request.

At block 226, processor 170 may determine the count of the currency notes to be dispensed based on the selected currency notes, without scanning or receiving data from currency sensor 140. The expected number of currency notes to be retrieved and dispensed (N) is determined based on the selection of currency notes, as described above with reference to block 224, by summing the number of currency notes of each denomination selected. The expected value of the currency notes to be dispensed would be the same as the amount (value) requested for withdrawal.

Figure 2C:
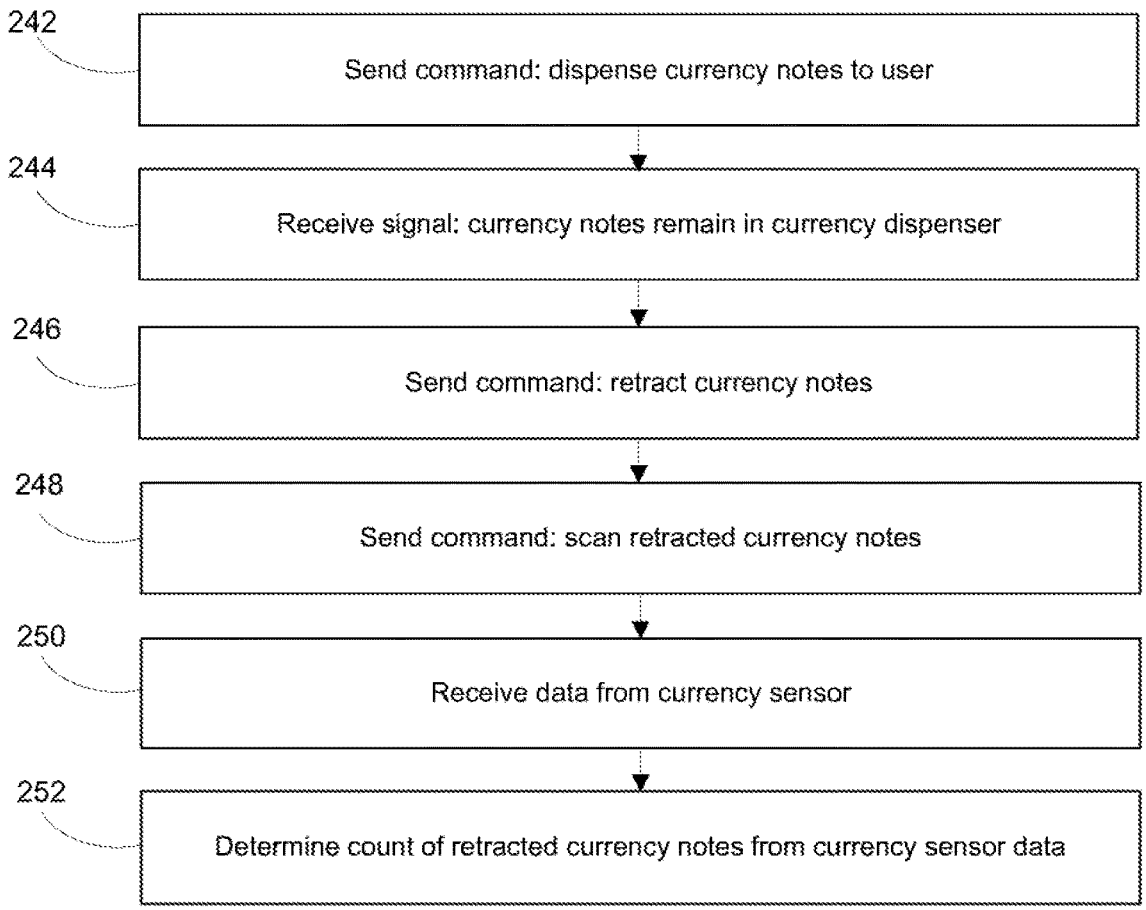

With reference to FIG. 2C, at block 242 processor 170 may send a command to dispenser 120 to dispense the retrieved currency notes to the user. In response, the retrieved currency notes within currency dispenser (described above with reference to block 204) may be presented to the user via currency dispenser 120. As described above, currency dispenser 120 may include a cash port or cash opening through which currency notes are presented for the user to physically remove from ATM system 100.

At block 244, processor 170 may receive a signal from currency dispenser 120 regarding the presence or absence of currency notes in currency dispenser 120. As described above, currency dispenser 120 may be configured to detect the presence and/or absence of currency notes, which may indicate when a user removes, or fails to remove, currency notes which have been dispensed to the user. For example, the signal may indicate that the currency dispenser is not empty, meaning that some or all of the dispensed currency notes remain within currency dispenser 120. In some embodiments, currency dispenser 120 may be configured to issue a signal only when the dispenser is empty, meaning the absence of a signal may indicate that some or all of the dispensed currency notes remain in currency dispenser 120. In some embodiments, processor 170 may wait a predetermined time period after the currency notes have been presented to the user before determining the presence or absence of a signal from currency dispenser 120, in order to allow the user time to remove the currency notes from ATM system 100. If the user removes all of the dispensed currency notes, such that no currency notes remain within currency dispenser 120, the transaction operation may be deemed complete, subject to any action required to debit or otherwise adjust the user's account by the amount (e.g., dollar value) of currency notes dispensed, and the system may reset for the next transaction.

At block 246, it may have been determined that one or more currency notes remain within currency dispenser 120 (as described above with reference to block 244), which may indicate the user simply forgot to remove all of the currency notes, or may indicate a potentially fraudulent condition (e.g., intentional removal of some, but not all, currency notes). Accordingly, processor 170 may issue a command to retract the dispensed currency notes. Retracting of the currency notes may be performed by currency dispenser 120; for example, currency dispenser 120 may reverse the electromechanical action involved in presenting the currency notes for removal by the user. After retracting, the currency notes are no longer in position to be physically removed from ATM system 100. Instead, the retracted currency notes may be positioned within the internal structure of ATM system 100. In some embodiments, the retracted currency notes may remain positioned within currency dispenser 120. In some embodiments, the retracted currency notes may be transferred to storage container 150. In some embodiments, the retracted currency notes may be transferred to the respective currency cassette(s) corresponding to the denomination of each retracted currency note.

At block 248, processor 170 may issue a scan command to currency sensor 140 to scan the retracted currency notes; the command may include a read command to read data from currency sensor 140. As described above, currency sensor 140 may be incorporated or positioned within currency dispenser 120. In some embodiments, currency sensor 140 may be configured to activate to scan notes within currency dispenser 120 only upon a command. In some embodiments, currency sensor 140 may be configured to activate and scan notes within currency dispenser without receiving a command, e.g., currency sensor 140 may be always active or may activate on a periodic basis, or may otherwise activate upon signal from another component. A read command may allow processor 170 to read data from currency sensor 140. In some embodiments, a second currency sensor 140 may be incorporated or positioned within storage container 150, in which case processor 170 would issue the command to, and read data from, the second currency sensor 140, as appropriate, in the same manner as described above.

At block 250, processor 170 may receive data from the appropriate currency sensor 140. The currency sensor data relates to retracted currency notes which may be positioned within currency dispenser 120 or within storage container 150 (block 246), and receipt of data from the appropriate currency sensor 140 may be responsive to the scan command (block 248), which may be or include a read command, or to another signal.

At block 252, processor 170 may determine the count of the retracted currency notes based on the data received from the appropriate currency sensor 140 (block 250). In some embodiments, the processor 170 may determine the value of the retracted currency notes based on the data received from currency sensor 140, which may include image data for each of the retracted currency notes. For example, the denomination of each imaged currency note may be determined from the image data, and the value of the retracted currency notes may be determined by summing the denomination as determined for each of these currency notes. In some embodiments, processor 120 may receive data or signals from another counting device and use such data or signals to determine the count of the retracted currency notes.

Figure 2D:
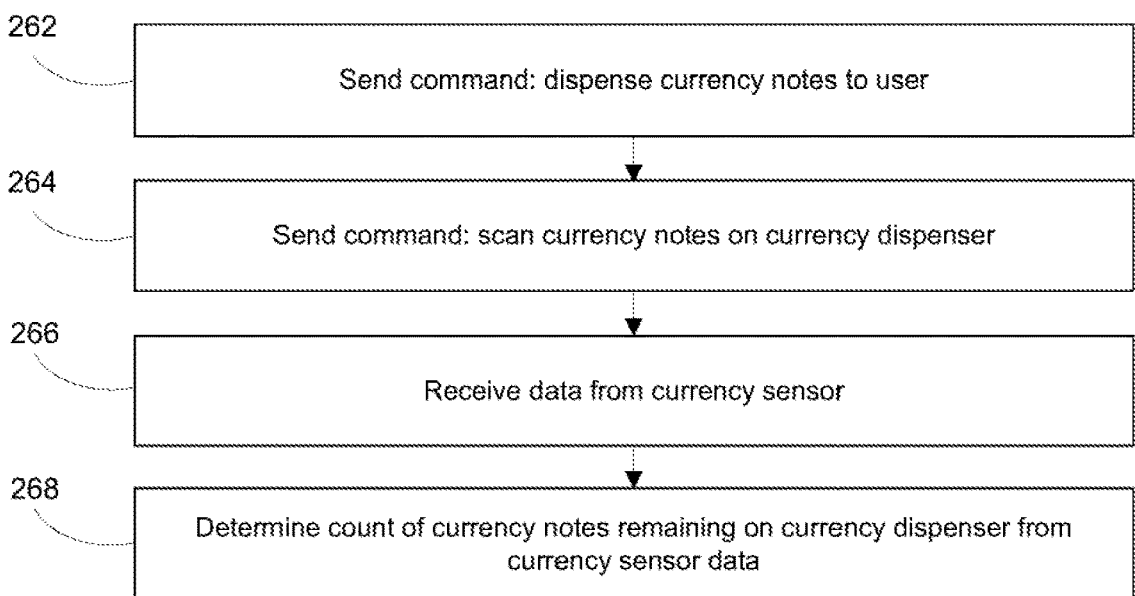

With reference to FIG. 2D, at block 262 processor 170 may send a command to dispenser 120 to dispense the retrieved currency notes to the user. In response, the retrieved currency notes within currency dispenser (described above with reference to block 204) may be presented to the user via currency dispenser 120. As described above, currency dispenser 120 may include a cash port or cash opening through which currency notes are presented for the user to physically remove from ATM system 100.

At block 264, processor 170 may issue a scan command to currency sensor 140 to scan the currency notes within currency dispenser 120; the command may include a read command to read data from currency sensor 140. As described above, currency sensor 140 may be incorporated or positioned within currency dispenser 120. In some embodiments, currency sensor 140 may be configured to activate and scan notes within currency dispenser 120 only upon a command. In some embodiments, currency sensor 140 may be configured to activate and scan notes within currency dispenser without receiving a command, e.g., currency sensor 140 may be always active or may activate on a periodic basis, or may otherwise activate upon signal from another component. A read command may allow processor 170 to read data from currency sensor 140. In some embodiments, processor 170 may wait a predetermined time period after the currency notes have been presented to the user before issuing a scan command to currency sensor 140.

At block 266, processor 170 may receive data from the appropriate currency sensor 140. The currency sensor data relates to currency notes which may be positioned within currency dispenser 120, and receipt of data from currency sensor 140 may be responsive to the scan command (block 264), which may be or include a read command, or to another signal.

At block 268, processor 170 may determine the count of the currency notes (if any) based on the data received from currency sensor 140 (block 266). In some embodiments, the processor 170 may determine the value of the currency notes based on the data received from currency sensor 140, which may include image data for each of the currency notes. For example, the denomination of each imaged currency note may be determined from the image data, and the value of the currency notes may be determined by summing the denomination as determined for each of these currency notes. If the resulting count is zero, this would indicate that the user removed all of the dispensed currency notes from currency dispenser 120. In some embodiments, processor 120 may receive data or signals from another counting device and use such data or signals to determine the count of the currency notes. As described below with reference to FIG. 4, the count (or value, if determined) of retrieved currency notes to be dispensed may be validated by comparing to the expected count (or value) of the retrieved currency notes.

Figure 3:
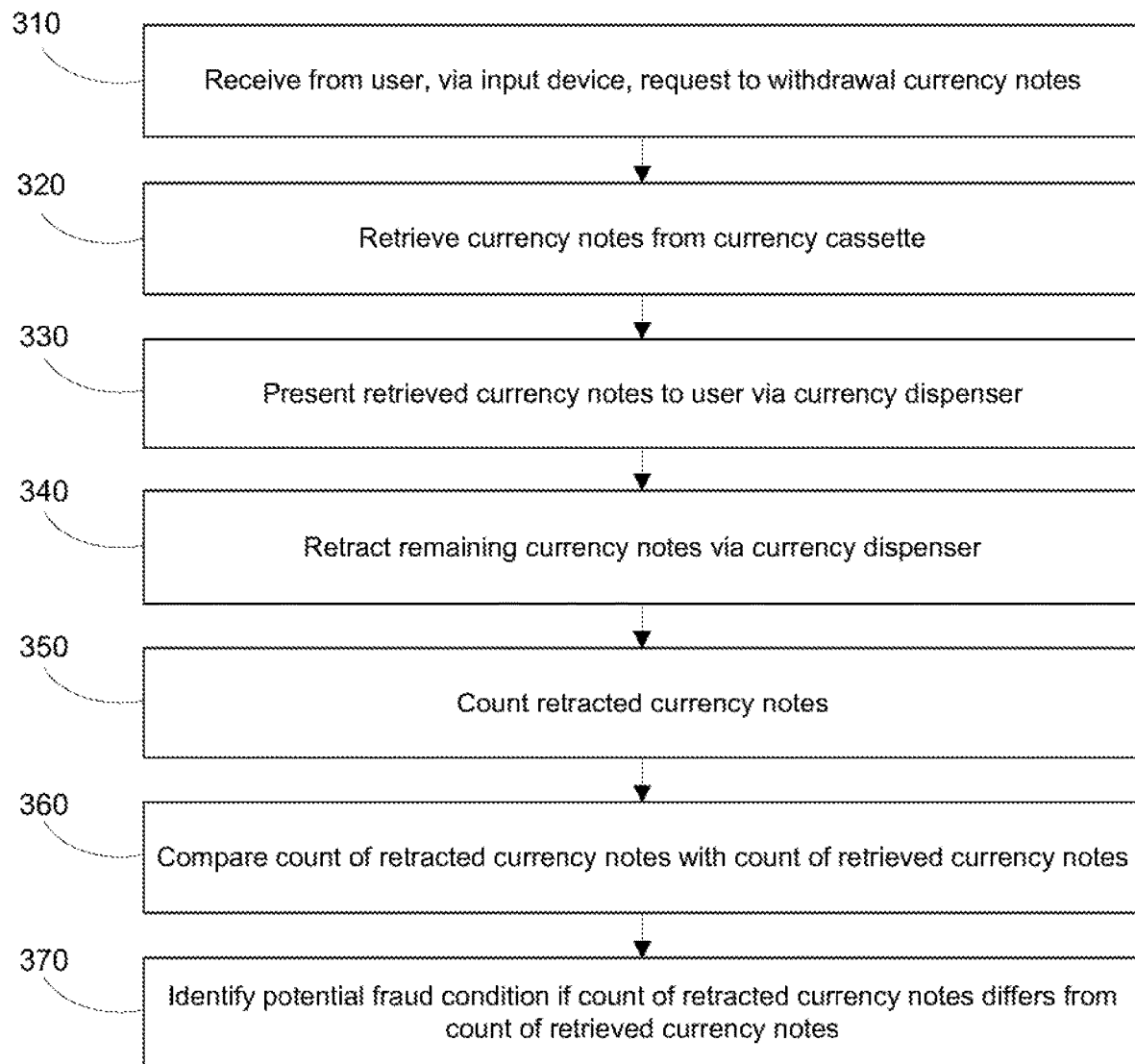
FIG. 3 is a flowchart illustrating a method of ATM fraud detection according to one or more example embodiments.

FIG. 3 is a flowchart illustrating a method of ATM fraud detection 300 according to one or more example embodiments, with reference to components and features described above including but not limited to the figures and associated description. ATM fraud detection method 300 may be carried out by components of ATM system 100 (including, e.g., via application 160 executing in conjunction with processor 170).

At block 310, ATM system 100 may receive from a user a request to withdraw currency notes from the ATM. The user's request to withdraw currency notes may be received via an input device on the ATM, as described above with reference to block 202 (FIG. 2A).

At block 320, the system may retrieve currency notes from one or more currency cassettes 130 and the retrieved currency notes may be placed in position within currency dispenser 120, as described above with reference to FIG. 2A. The number and denomination of currency notes retrieved from the currency cassette(s) may depend upon the amount of currency requested by the user to be withdrawn, and/or the availability of currency notes of a certain denomination in a currency cassette, as described above with reference to block 224 (FIG. 2B).

At block 330, the retrieved currency notes (block 320) may be presented to the user via currency dispenser 120, as discussed above with reference to blocks 242-244 (FIG. 2C). A signal from currency dispenser 120 may indicate the presence or absence of currency notes in currency dispenser 120, as discussed above with reference to block 244.

At block 340, some or all of the presented currency notes may be retracted, such that they are no longer available for removal by the user, as described above with reference to block 246 (FIG. 2C).

At block 350, the retracted currency notes may be counted, as described above with reference to blocks 248-252 (FIG. 2C).

At block 360, the count of the retracted currency notes (block 350) may be compared to the count of the currency notes retrieved and presented to the user. The count of the currency notes retrieved and presented to the user may be based on a counting process applied to the retrieved notes, as described above with reference to FIG. 2A. In some embodiments, the count of the currency notes retrieved and presented to the user may be based on the expected count of such notes, as described above with reference to block 226 (FIG. 2B). If the result from the comparison is that the count of the retracted currency notes is the same as the count of the dispensed currency notes, then it may be determined that there is no fraud condition resulting from the user's failure to remove all of the dispensed currency notes. Accordingly, the transaction may be deemed complete, subject to any action required to credit or otherwise adjust the user's account by the amount (e.g., dollar value) of currency notes retracted (e.g., if previously debited), and the system may reset for the next transaction.

At block 370, if the result from the comparison (block 360) is that the count of the retracted currency notes is different from the count of the dispensed currency notes, then it may be determined that there is a potential fraud condition resulting from the apparent removal of some but not all of the dispensed currency notes. Upon such a determination, ATM system 100 may issue a fraud alert (as described further below with reference to FIG. 4B).

Figure 4A:
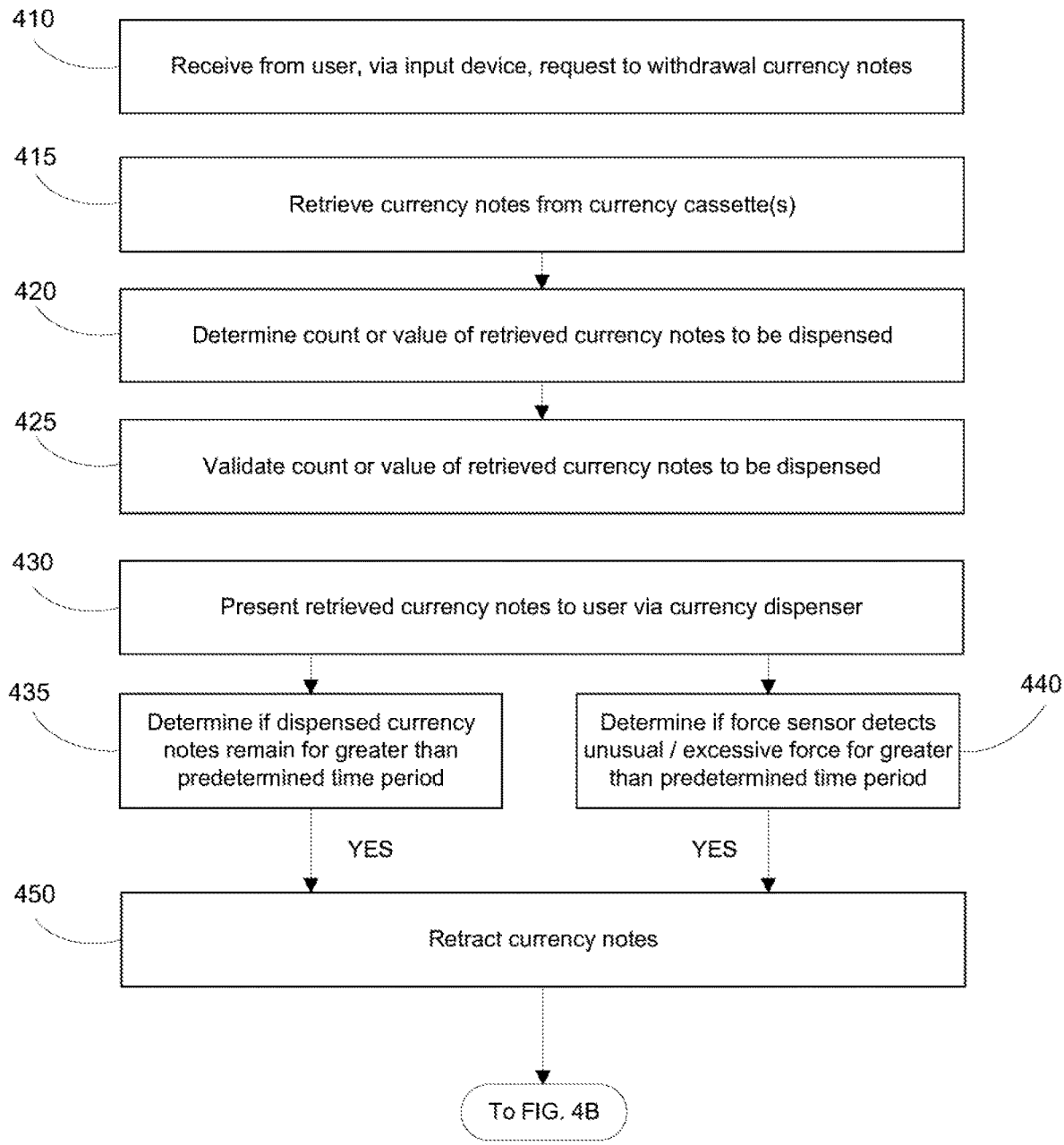
FIGS. 4A-4B present a flowchart illustrating a method of ATM fraud detection according to one or more example embodiments
Figure 4B:
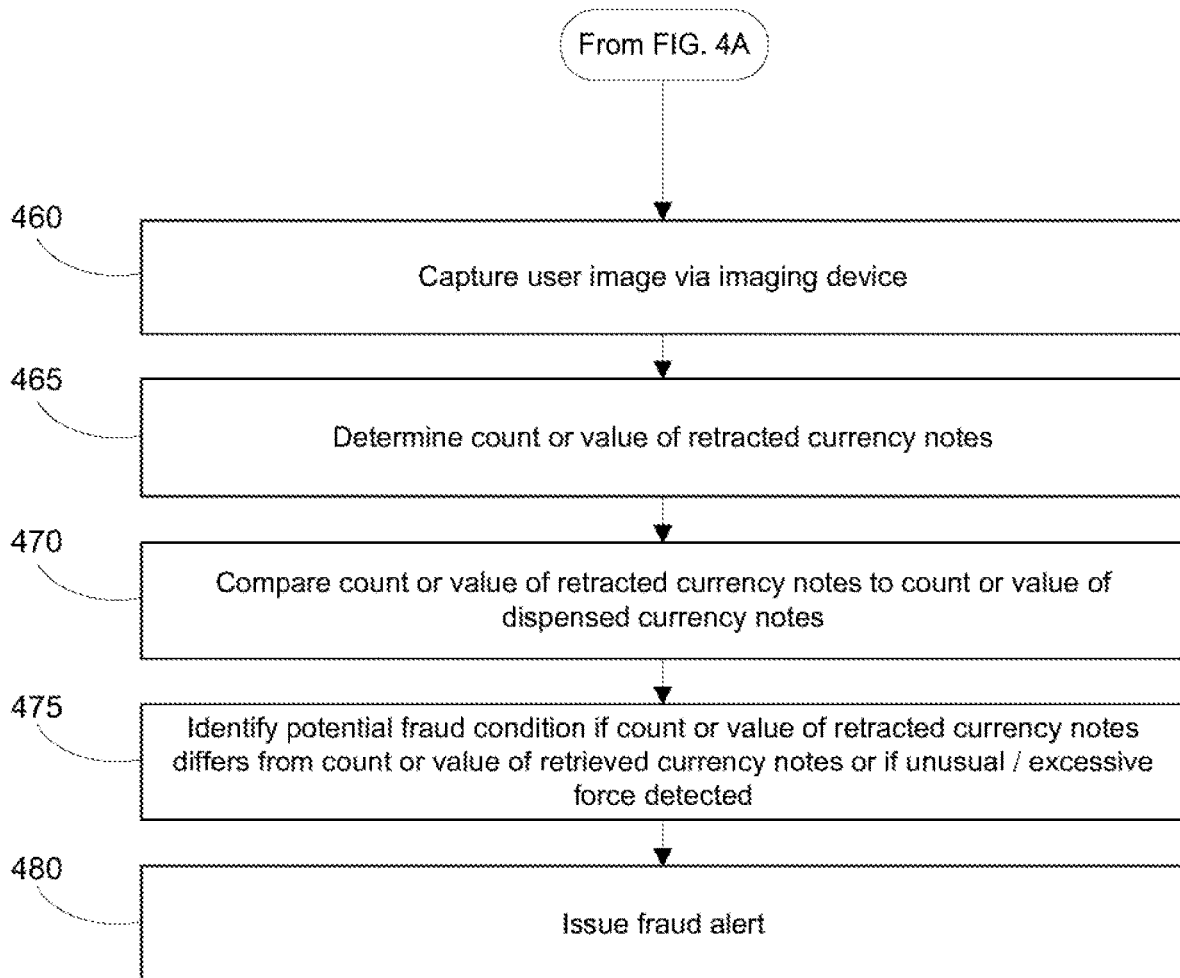

FIGS. 4A-4B present a flowchart illustrating a method of ATM fraud detection 400 according to one or more example embodiments, with reference to components and features described above including but not limited to the figures and associated description. ATM fraud detection method 400 may be carried out by components of ATM system 100 (including, e.g., via application 160 executing in conjunction with processor 170).

At block 410, ATM system 100 may receive from a user a request to withdraw currency notes from the ATM. The user's request to withdraw currency notes may be received via an input device on the ATM, as described above with reference to block 202 (FIG. 2A)

At block 415, the system may retrieve currency notes from one or more currency cassettes 130 and the retrieved currency notes may be placed in position within currency dispenser 120, as described above with reference to FIG. 2A. The number and denomination of currency notes retrieved from the currency cassette(s) may depend upon the amount of currency requested by the user to be withdrawn, and/or the availability of currency notes of a certain denomination in a currency cassette, as described above with reference to block 224 (FIG. 2B).

At block 420, the retrieved currency notes may be counted prior to being presented to the user, as described above with reference to blocks 206-210 (FIG. 2A). In some embodiments, the value of the retrieved currency notes may be determined, as described above with reference to block 210.

At block 425, the count (or value, if determined) of the retrieved currency notes to be dispensed (block 420) may be validated, by comparing to the expected count (or value) of the retrieved currency notes. The expected count (or value) may be determined as described above with reference to block 226 (FIG. 2B). If the result of the comparison is that the count (or value, if determined) of the retrieved currency notes (block 420) is the same as the expected count (or value), then the count (or value) of the retrieved currency notes to be dispensed may be deemed validated.

At block 430, once the retrieved currency notes (block 415) in currency dispenser 120 are ready for dispensing, the retrieved currency notes may be presented to the user via currency dispenser 120 as discussed above with reference to blocks 242-244 (FIG. 2C).

At block 435, the system may check to determine whether any of the presented currency notes remain within currency dispenser 120 for more than a predetermined time period. A signal from currency dispenser 120 may indicate the presence or absence of currency notes in currency dispenser 120, as discussed above with reference to block 244 (FIG. 2C). If the user removes all of the presented currency notes, such that no currency notes remain within currency dispenser 120, the transaction operation may be deemed complete, subject to any action required to debit or otherwise adjust the user's account by the amount (e.g., dollar value) of currency notes dispensed, and the system may reset for the next transaction. If the user does not remove all of the presented currency notes within a predetermined time period after being presented to the user, it may be determined that one or more currency notes remain within currency dispenser 120 for more than a first predetermined time period, and the process may continue at block 450.

At block 440, while the currency notes are being presented to and available for removal by the user, a signal or data may be received from force sensor 145, indicating the presence of an unusual or excessive pushing, pulling or twisting force. The presence of such a force lasting for more than a predetermined time period may be indicative of an attempt to defraud by, e.g., improperly attempting to remove a portion, but not all, of the dispensed currency notes or improperly attempting to replace larger denomination currency notes with smaller denomination currency notes. Continuous large and prolonged detected force may also indicate that it is difficult to remove the notes from the machine and may warrant a repair or inspection of the ATM.

At block 450, it has been determined (a) that one or more currency notes remain within currency dispenser 120 for more than a first predetermined time period, and/or (b) that an unusual or excessive pushing or pulling force lasting for more than a second predetermined time period is present. In either case, the event may indicate a potentially fraudulent condition. Accordingly, any remaining currency notes may be retracted to a position within the internal structure of ATM system 100, such that they are no longer available for removal by the user, as described above with reference to block 246 (FIG. 2C).

At block 460, an image or images of the user may be captured by an imaging device such as, e.g., a digital camera, video recorder, or camcorder. The imaging device may be positioned on or in the vicinity of ATM system 100 such that the imaging device can capture or record images of a user while the user is attempting to use ATM system 100 or is otherwise within the vicinity of ATM system 100. For example, the processor may issue a command or signal to the imaging device to cause the imaging device to begin capturing images of the user as the user may be using ATM system 100. A command or signal to the imaging device to record user images may be issued upon detection of one or more potential fraud events as described above (e.g., with reference to blocks 435 and 440).

At block 465, the retracted currency notes may be counted, as described above with reference to blocks 248-252 (FIG. 2C). In some embodiments, the value of the retracted currency notes may be determined, as described above with reference to block 252.

At block 470, the count (or value, if determined) of the retracted currency notes (block 465) may be compared to the count (or value, if determined) of the retrieved/dispensed currency notes (actual count, as in block 420, or expected count, as in block 226). If the result from the comparison is that the count (or value, if determined) of the retracted currency notes is the same as the count (or value, if determined) of the retrieved/dispensed currency notes, then it may be determined that there is no fraud condition resulting from the user's failure to remove all of the dispensed currency notes. If there is no potential fraud condition relating to the force sensor (block 440), the transaction may be deemed complete, subject to any action required to credit or otherwise adjust the user's account by the amount (e.g., dollar value) of currency notes retracted (e.g., if previously debited), and the system may reset for the next transaction.

At block 475, if the difference resulting from the comparison (block 470) is that the count (or value, if determined) of the retracted currency notes is different from the count (or value, if determined) of the dispensed currency notes, then it may be determined that there is a potential fraud condition resulting from the apparent removal of some but not all of the dispensed currency notes. Furthermore, if there has been detected an unusual or excessive force (block 440), there may be determined a potential fraud condition relating to the force sensor.

At block 480, if there is (a) a potential fraud condition resulting from the apparent removal of some but not all of the dispensed currency notes, and/or (b) a potential fraud condition relating to the force sensor, a fraud alert may be issued by ATM system 100. In some embodiments, a fraud alert may include one or more of outputting a sound alarm, illuminating one or more lights, displaying message on screen, etc. In some embodiments, a fraud alert may include sending a fraud alert message to a bank or other account manager, ATM operator, etc. A fraud alert message may provide information about the potential fraud event, including information identifying the user, the date/time of the transaction, count or value data, force data, results of any or comparisons, and/or images obtained, etc.

In some embodiments, when notes are scanned, data from currency sensor 140 (including data from any infrared or ultraviolet sensor, magnetic ink sensor, and metal thread sensor) may be used to detect the presence of one or more counterfeit notes. For example, if retracted currency notes are scanned, the data from currency sensor 140 (including data from any infrared or ultraviolet sensor, magnetic ink sensor, and metal thread sensor) may be compared to stored data to determine if a scanned note fails to match any known currency notes, or the data from currency sensor 140 (including data from any infrared or ultraviolet sensor) may be examined to identify the presence or absence of markers that would ordinarily be present for legitimate currency notes. This may include examining the data for presence of a watermark or reflection of security bands in the scanned notes. Upon detection of one or more counterfeit notes, an alert (such as the fraud alert described above, or a separate counterfeit alert) may be issued.

In some embodiments, when notes are scanned, data from currency sensor 140 (including data from any infrared or ultraviolet sensor) may be used to detect or record the serial numbers for the scanned notes. For example, if retracted currency notes are scanned, the data from currency sensor 140 (including data from any infrared or ultraviolet sensor) may contain the serial numbers, or image data of the serial numbers, which may be communicated to processor 170 and recorded (e.g., stored) for later analysis, etc. Optical character recognition may be employed to detect numbers (e.g., serial numbers) in scanned currency notes. Similarly, when currency notes retrieved from currency cassette(s) to be dispensed are scanned, the data from currency sensor 140 (including data from any infrared or ultraviolet sensor) may contain the serial numbers, or image data of the serial numbers, which may be communicated to processor 170 and recorded (e.g., stored) for later analysis, etc.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of detecting fraud, comprising:
   presenting one or more currency notes via a currency dispenser;
   detecting, by a force sensor, a force applied to the currency dispenser;
   issuing an alert upon detection of the force applied to the currency dispenser for longer than a predetermined time period; and
   retracting any of the one or more currency notes remaining via the currency dispenser.

2. The method of detecting fraud of claim 1, wherein issuing an alert comprises transmitting information comprising at least one selected from the group of information identifying a user, the date of the presentation of the one or more currency notes, the time of the presentation of the one or more currency notes, a count of the one or more currency notes, a value of the one or more currency notes, the strength of the force, and the duration of the force.

3. The method of detecting fraud of claim 1, further comprising applying optical character recognition to detect serial numbers of the retracted one or more currency notes.

4. The method of detecting fraud of claim 1, further comprising detecting the presence of a watermark or a security band in the retracted one or more currency notes.

5. The method of detecting fraud of claim 1, further comprising:
   retrieving, prior to presentation, the one or more currency notes from a currency cassette;
   scanning the retracted currency notes; and
   comparing a count of the retracted currency notes to a count of the currency notes retrieved from the currency cassette.

6. The method of detecting fraud of claim 5, further comprising determining a fraud condition if the count of the retracted currency notes differs from the count of the currency notes retrieved from the currency cassette.

7. The method of detecting fraud of claim 5, further comprising determining a value of the retracted currency notes and comparing the value of the retracted currency notes to a value of the currency notes retrieved from the currency cassette.

8. The method of detecting fraud of claim 7, further comprising determining a fraud condition if the value of the retracted currency notes differs from the value of the currency notes retrieved from the currency cassette.

9. A fraud detection system comprising:
   a currency dispenser configured to dispense currency notes;
   a force sensor configured to detect a force applied to the currency dispenser; and
   a processor configured for data communication with the currency dispenser and the force sensor, wherein the processor is configured to issue an alert if the force sensor detects the force for longer than a predetermined time period.

10. The fraud detection system of claim 9, wherein the force sensor is integrated with the currency dispenser.

11. The fraud detection system of claim 10, wherein the currency dispenser comprises at least one selected from the group of a belt and a tray.

12. The fraud detection system of claim 11, wherein the force sensor is configured to detect the force on the at least one selected from the group of the belt and the tray.

13. The fraud detection system of claim 9, wherein the force sensor comprises a strain gauge.

14. The fraud detection system of claim 9, wherein the force sensor comprises a deflection sensor.

15. The fraud detection system of claim 9, further comprising an imaging device, wherein:
   the imaging device is configured to, in response to a command from the processor, capture an image in the vicinity of the system, and
   the processor is configured to issue the command upon detection of the force for longer than the predetermined time period by the force sensor.

16. The fraud detection system of claim 15, wherein the imaging device is configured to capture an image of a user in the vicinity of the system.

17. The fraud detection system of claim 9, further comprising a currency sensor, wherein:
  any currency notes remaining in the currency dispenser after being dispensed to the user are retracted, and
  the processor is configured to determine the count of the retracted currency notes.

18. The fraud detection system of claim 17, wherein the processor is further configured to:
  compare a count of the dispensed currency notes and a count of the retracted currency notes, and
  determine a fraud condition if the count of the dispensed currency notes differs from the count of the retracted currency notes.

19. The fraud detection system of claim 17, wherein the currency dispenser is configured to transfer the retracted currency notes to a secure storage container.

20. A non-transitory computer-accessible medium having stored thereon computer-executable instructions, wherein upon execution by a computer arrangement comprising a processor, a currency dispenser, a currency sensor, a force sensor, and an imaging device, the instructions cause the computer arrangement to perform procedures comprising:
  presenting, by the currency dispenser, one or more currency notes;
  detecting, by the force sensor, a force applied to the currency dispenser; and
  upon detection by the force sensor of the force for longer than a predetermined time period:
    issuing, by the processor, a command to the image sensor,
    capturing, by the image sensor responsive to the command, an image of the vicinity of the computer arrangement,
    retracting, by the currency dispenser, any currency notes remaining in the currency dispenser, and
    issuing, by the processor, an alert.

* * * * *